July 21, 1942.   W. A. BRUNO   2,290,579
RIGHT ANGLE DRIVE
Filed Oct. 20, 1941
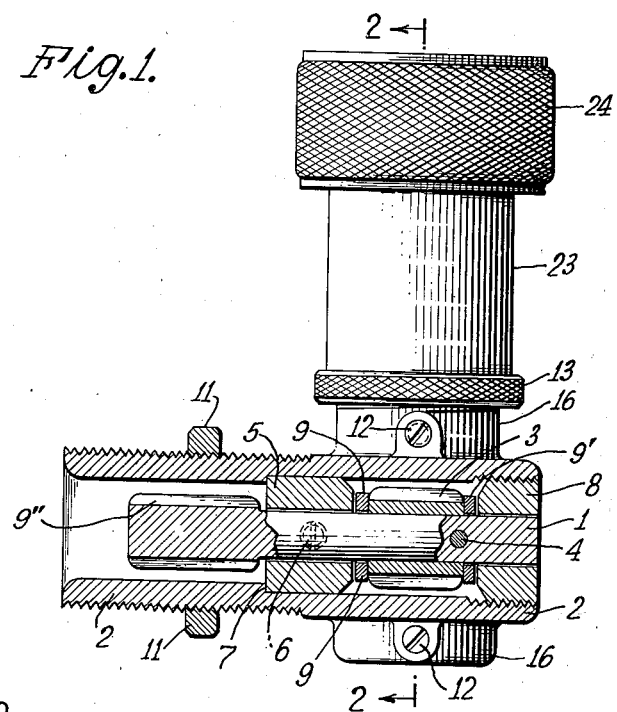
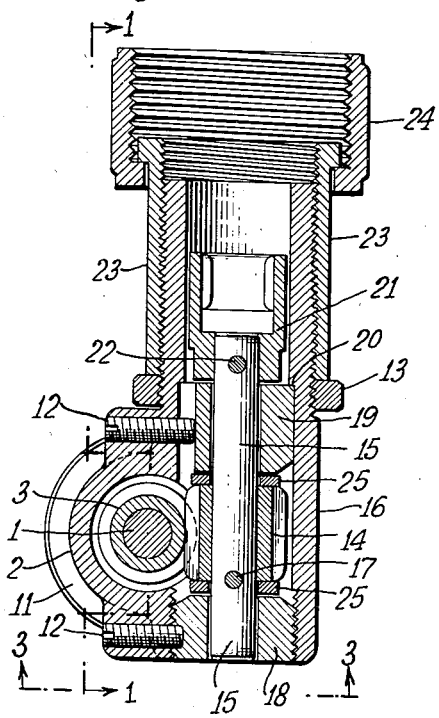
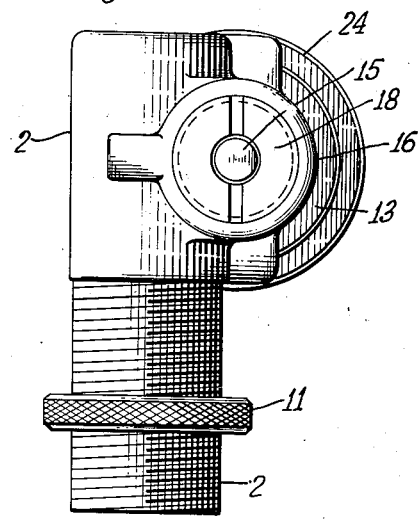
INVENTOR
WILLIAM A. BRUNO
BY
ATTORNEY Patented July 21, 1942

2,290,579

UNITED STATES PATENT OFFICE 2,290,579

RIGHT ANGLE DRIVE

William A. Bruno, Astoria, Long Island, N. Y., assignor to the firm Bruno Patents Inc., Long Island City, N. Y.

Application October 20, 1941, Serial No. 415,677

2 Claims. (Cl. 74—424.5)

This invention relates to a right angle drive mechanism, and more particularly to a right angle drive mechanism of the type which may conveniently be employed in connection with flexible shafts.

It is the main object of my invention to provide a right angle drive mechanism which can be assembled in a tubular housing which consists of one piece only.

A further object of my invention is to provide a drive mechanism which is compact when assembled, and reliable in operation.

It is also an object of my invention to provide a drive mechanism of the above mentioned type, which is relatively simple and inexpensive to manufacture.

Other objects and advantages will appear from the following specification and the appended drawing, in which Fig. 1 is a sectional view through a right angle drive mechanism according to this invention, the section being taken along line 1—1 in Fig. 2;

Fig. 2 is a sectional view along line 2—2 in Fig. 1 of the device shown in Fig. 1, and Fig. 3 is a front view of this device viewed in the direction of the arrows 3—3 in Fig. 2.

As shown in Figs. 1 and 2, the shafts of the right angle drive mechanism are housed by tubular elements forming a one-piece right-angle housing. Shaft 1, which is housed by the tubular element 2, carries a spiral gear 3, which is fastened to the shaft by means of a pin 4. Said spiral gear element 3 is restrained against axial movement by a nut 8 threaded into the right end of sleeve 2, as viewed in Fig. 1, and by an annular ring 5, which lies against a shoulder 7 formed in the housing 2, and is fastened by screw 6. Thrust rings 9 and 9' are interposed between the ends of the spiral gear element 3, and elements 5 and 8, respectively. The left end of the shaft is splined, as indicated at 9'', and is adapted to be connected with a flexible driving shaft not shown in the drawing. The threaded outer surface of the tubular part 2 carries a locking nut 11, and is adapted to be connected with the housing of a flexible shaft.

As shown in Fig. 2, a second spiral gear 14, which meshes with spiral gear 3, is mounted on shaft 15 and is fastened to said shaft by pin 17. Said spiral gear is restrained against axial movement by thrust rings 25, a nut 18, which is screwed into the threaded end of sleeve 16, and by a ring member 19, from which a segment is cut off on the upper part of the ring, and which lies against a shoulder 20 in sleeve 16, and is fastened by screw 12. An internally splined piece 21 is fastened to the other end of shaft 15 by screw 22, and is adapted to form a splined connection with a driven shaft, for example. A threaded, flanged tube 23, provided with a locking nut 24 may be screwed on the threaded outer surface of sleeve 16 in order to make the length of the device adjustable in the direction of shaft 15.

Ring 5 may have the same form as ring 19 or a similar form. Nuts 8 and 18 are adjustable to eliminate end play and compensate for wear.

While I have shown a particular embodiment of my invention, it will be understood that I do not wish to be limited thereto since various modifications may be made within the scope of my invention as defined in the appended claims.

I claim:

1. A mechanism comprising a driving shaft, and a driven shaft, said shafts carrying meshing spiral gears, a one piece casing formed of two intersecting, tubular members arranged at a substantially right angle, each of said tubular members containing an end thrust bearing member, and a journal bearing ring, which are adapted to be fastened in, and fit into said tubular member, for holding said shafts in operative position and restraining said spiral gears from axial movement, a segment being cut off from at least one of said bearing rings, whereby said bearing ring may be slipped past one of said gears upon insertion of said last mentioned ring into operative position in said casing.

2. A mechanism comprising a driving shaft, and a driven shaft, said shafts carrying meshing spiral gears, a one piece casing formed by two intersecting, tubular members forming a substantially right angle, each of said tubular members containing an end thrust bearing member threaded into an end of said tubular member, and a journal bearing ring lying against a shoulder in said tubular member, for holding said shafts in operative position and restraining said spiral gears from axial movement, a segment being cut off from at least one of said bearing rings, whereby said bearing ring may be slipped past one of said gears upon insertion of said last mentioned ring into operative position in said casing.

WILLIAM A. BRUNO.